United States Patent
Hosono et al.

(10) Patent No.: US 8,996,010 B2
(45) Date of Patent: Mar. 31, 2015

(54) MOBILE COMMUNICATION SYSTEM, RADIO CONTROLLER, BASE STATION, AND MOBILITY CONTROL METHOD

(75) Inventors: Hiroyuki Hosono, Tokyo (JP); Rie Nagato, Tokyo (JP); Takeshi Terayama, Tokyo (JP); Takeshi Okamoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 127 days.

(21) Appl. No.: 13/701,926

(22) PCT Filed: Jun. 3, 2011

(86) PCT No.: PCT/JP2011/062821
§ 371 (c)(1),
(2), (4) Date: Feb. 5, 2013

(87) PCT Pub. No.: WO2011/152528
PCT Pub. Date: Dec. 8, 2011

(65) Prior Publication Data
US 2013/0143567 A1    Jun. 6, 2013

(30) Foreign Application Priority Data
Jun. 4, 2010 (JP) ................................. 2010-129427

(51) Int. Cl.
*H04W 36/00*    (2009.01)
*H04W 36/30*    (2009.01)
(Continued)

(52) U.S. Cl.
CPC .............. *H04W 36/30* (2013.01); *H04W 52/04* (2013.01); *H04W 52/242* (2013.01); *H04W 52/243* (2013.01)
USPC ............................ 455/436; 455/438; 455/443

(58) Field of Classification Search
USPC ............ 455/422.1, 432.1, 436–444; 370/328, 370/329, 331–333
See application file for complete search history.

(56) References Cited

U.S. PATENT DOCUMENTS 8,095,165 B2 * 1/2012 Jung et al. ...................... 455/522
2005/0286458 A1 * 12/2005 Furukawa et al. ............. 370/315
2007/0280183 A1 * 12/2007 Cho et al. ....................... 370/338
(Continued)

FOREIGN PATENT DOCUMENTS

JP         2010 45547       2/2010

OTHER PUBLICATIONS

Office Action issued May 7, 2013, in Japanese patent Application No. 2010-129427 with English translation.
(Continued)

*Primary Examiner* — Ajit Patel
(74) *Attorney, Agent, or Firm* — Oblon, McClelland, Maier & Neustadt, L.L.P.

(57) ABSTRACT

A radio controller 100 includes a transmission power acquisition unit 111 configured to acquire a neighboring cell transmission power value that is a transmission power value of a radio signal transmitted from a base station forming the neighboring cell, an offset determination unit 115 configured to determine a power offset of the neighboring cell to be added to the predetermined transmission power value, based on a difference between the predetermined transmission power value and the neighboring cell transmission power value acquired by the transmission power acquisition unit, and an offset notification unit 117 configured to notify the power offset determined by the offset determination unit to the mobile station.

9 Claims, 8 Drawing Sheets

(51) Int. Cl.
*H04W 52/04* (2009.01)
*H04W 52/24* (2009.01)

(56) References Cited

U.S. PATENT DOCUMENTS

2008/0268893 A1* 10/2008 Lee et al. .................. 455/522
2010/0103867 A1* 4/2010 Kishiyama et al. ......... 370/320
2013/0250899 A1* 9/2013 Jeong et al. ................ 370/329

OTHER PUBLICATIONS

3GPP TSG RAN WG1 #49bis R1-072839, "On UL Power Control in EUTRA," Texas Instruments, Total 8 pages, (Jun. 25-29, 2007).

3GPP TSG RAN WG2 #58 Tdoc-R2-072228, "Draft LS on neighbour cell lists and reading neighbour cell P-BCH," NTT DoCoMo, Inc., Total 2 pages, (May 7-11, 2007).

3GPP-RAN-WG2 Meeting #16 R2-002042, NTT DoCoMo, Total 5 pages, (Sep. 9-13, 2000).

3GPP TS 25.331 V11.3.0, "$3^{RD}$ Generation Partnership Project; Technical Specification Group Radio Access Network; Radio Resource Control (RRC); Protocol specification (Release 11)," Total 1982 pages, (Sep. 2012).

International Search Report Issued Jun. 28, 2011 in PCT/JP11/62821 Filed Jun. 3, 2011.

Japanese Office Action issued on Jan. 8, 2013, in patent Application No. 2010-129427 with English translation.

Office Action issued Oct. 29, 2014 in Chinese Patent Application No. 201180027582.7 (with English translation).

\* cited by examiner

FIG. 4
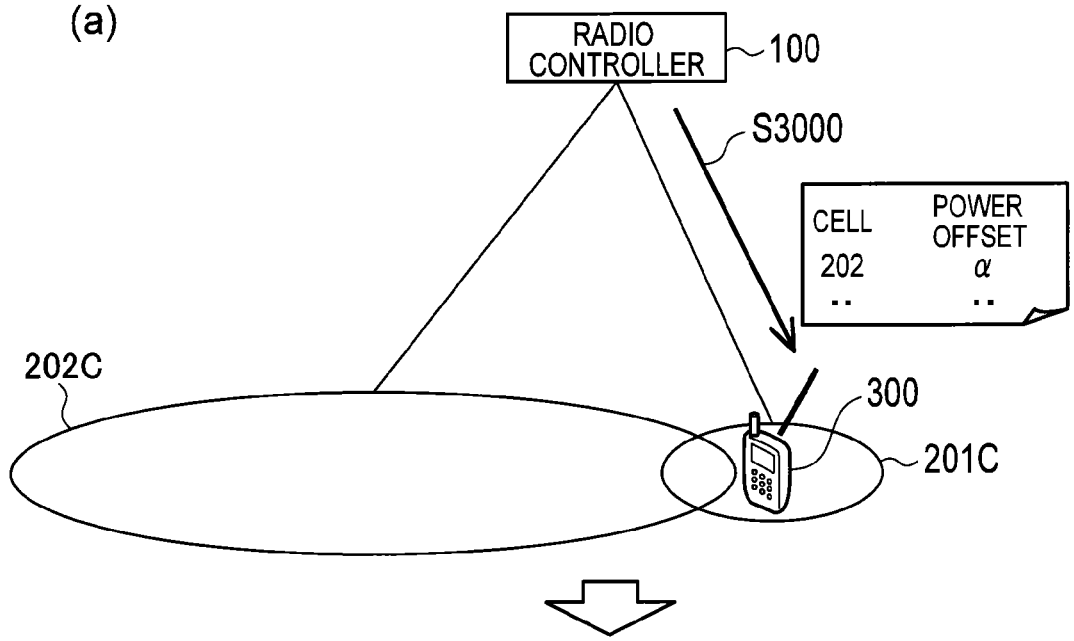
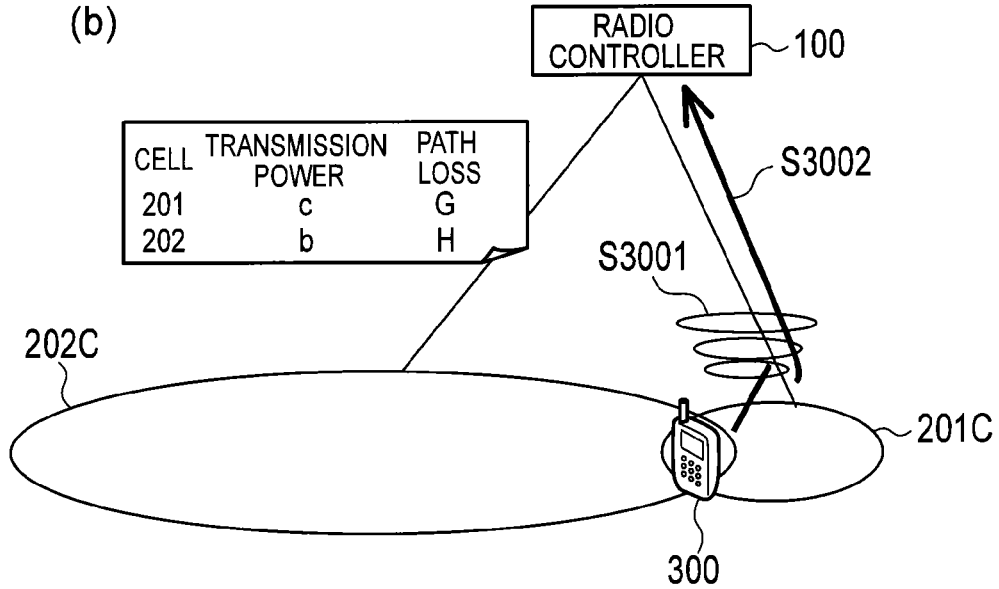

FIG. 8

| HOME CELL (BASE STATION) | TRANSMISSION POWER VALUE | NEIGHBORING CELL (BASE STATION) | NEIGHBORING CELL TRANSMISSION POWER | POWER OFFSET α (TRANSMISSION POWER VALUE − NEIGHBORING CELL TRANSMISSION POWER VALUE) |
|---|---|---|---|---|
| 200 | 10dBm | 201 | 5dBm | 5dBm (10−5) |
|  |  | 202 | 40dBm | −30dBm (10−40) |
|  |  | 203 | 30dBm | −20dBm (10−30) |
| 201 | 5dBm | 200 | 10dBm | −5dBm (5−10) |
|  |  | 202 | 40dBm | −35dBm (5−40) |
|  |  | 203 | 30dBm | −25dBm (5−30) |
| ⋮ | ⋮ | ⋮ | ⋮ | ⋮ |

500

MOBILE COMMUNICATION SYSTEM, RADIO CONTROLLER, BASE STATION, AND MOBILITY CONTROL METHOD

TECHNICAL FIELD

The present invention relates to a mobile communication system, a radio controller, a base station, and a mobility control method that control mobility of a mobile station from a predetermined cell to a neighboring cell of the predetermined cell.

BACKGROUND ART

A mobile communication system such as a mobile phone system generally includes multiple cells having different sizes. For example, a cell (hereinafter, referred to as "large cell" for convenience) formed by a general base station for public communications and a cell (hereinafter, referred to as "small cell" for convenience) covering a particular spot generally coexist.

Such a mobile communication system is required to perform mobility control for controlling which cell a mobile station is to camp on. As a method for the mobility control, a method of using a difference in a path loss value between cells is widely used. Specifically, each cell notifies a transmission power value of a common control channel (Common Pilot Channel (CPICH) in W-CDMA system) to a mobile station. The mobile station calculates the path loss value based on the transmission power value notified from each cell and the reception power value of the common control channel form the cell. The mobile station requests handover to the cell neighboring the current cell when the difference in the path loss value between the cells converges to a predetermined range (for example Non-Patent Document 1).

However, multiple cells of the different sizes generally coexist in the mobile communication system as described above. Thus, the transmission power value of the common control channel differs between the cells. Accordingly, in some cases, the mobility control cannot be carried out appropriately with the mobility control based on the path loss value as described above.

Generally, the transmission power value of the common control channel of the small cell is smaller than the transmission power value of the large cell. Accordingly, with the simple mobility control in which the mobile station requests a handover when the difference in the path loss value converges to the predetermined range, the handover might be requested at a position outside the area covered by the small cell. Thus, smooth handover of the mobile station between the cells is hindered.

Thus, to solve such a problem, another method is specified in which each cell notifies its power offset (Cell Individual Offset (CIO) in a W-CDMA system) to neighboring cells in the neighborhood thereof (see Non-Patent Document 1). The mobile station calculates the path loss value with the transmission power value to which the power offset is added.

PRIOR ART DOCUMNET

Non-Patent Document

Non-Patent Document 1: 3GPP TS 25.331: Radio Resource Control (RRC); Protocol Specification

SUMMARY OF THE INVENTION

In recent years, many cells (femtocells) formed by small base stations that users of mobile stations can freely install have been used. In this situation, it is actually impossible for an operator of the mobile communication system to set the power offset as described above for each femtocell. Thus, there is a problem that the smooth mobility of the mobile station between the cells is hindered.

The present invention is made in view of such circumstances and an objective of the present invention is to provide a mobile communication system, a radio controller, a base station, and a mobile communication method that can achieve smooth mobility of the mobile station between the cells with mobility control for the mobile station based on a path loss value, even when small cells such as femtocells are freely installed.

A mobile communication system according to the feature of the present invention is configured to control mobility of a mobile station (UE 300) from a predetermined cell (cell 201C, for example) to a neighboring cell of the predetermined cell (cell 202C, for example) on the basis of a path loss value (path loss #G) based on a predetermined transmission power value (transmission power value c, for example) that is a transmission power value of a radio signal (common control channel, for example) transmitted from a base station (base station 201) forming the predetermined cell and a reception power value of the radio signal in the mobile station. The system includes a transmission power detection unit (transmission power detection unit 211) configured to detect a neighboring cell transmission power value (transmission power value b, for example) that is a transmission power value of a radio signal transmitted from a base station forming the neighboring cell, an offset determination unit (offset determination unit 115) configured to determine a power offset (power offset a) of the neighboring cell to be added to the predetermined transmission power value, based on a difference between the predetermined transmission power value and the neighboring cell transmission power value detected by the transmission power detection unit, and an offset notification unit (offset notification unit 117) configured to notify the power offset determined by the offset determination unit to the mobile station.

In the feature of the present invention described above, the transmission power detection unit may receive notification including a transmission power value of a common control channel transmitted by the neighboring cell, and may detect the neighboring cell transmission power value based on the received notification.

In the feature of the present invention described above, the offset determination unit may determine a difference between the predetermined transmission power value and the neighboring cell transmission value as the power offset.

BRIEF DESCRIPTION OF DRAWINGS

FIG. 4 is a diagram showing an example of the handover control for the mobile station 300 in which the mobile station 300 is prevented from requesting the handover at a position outside a service area of the cell 201C.

FIG. 8 is a diagram showing an example of a transmission power table 500 determined by an offset determination unit 115.

MODE FOR CARRYING OUT THE INVENTION

Figure 1:
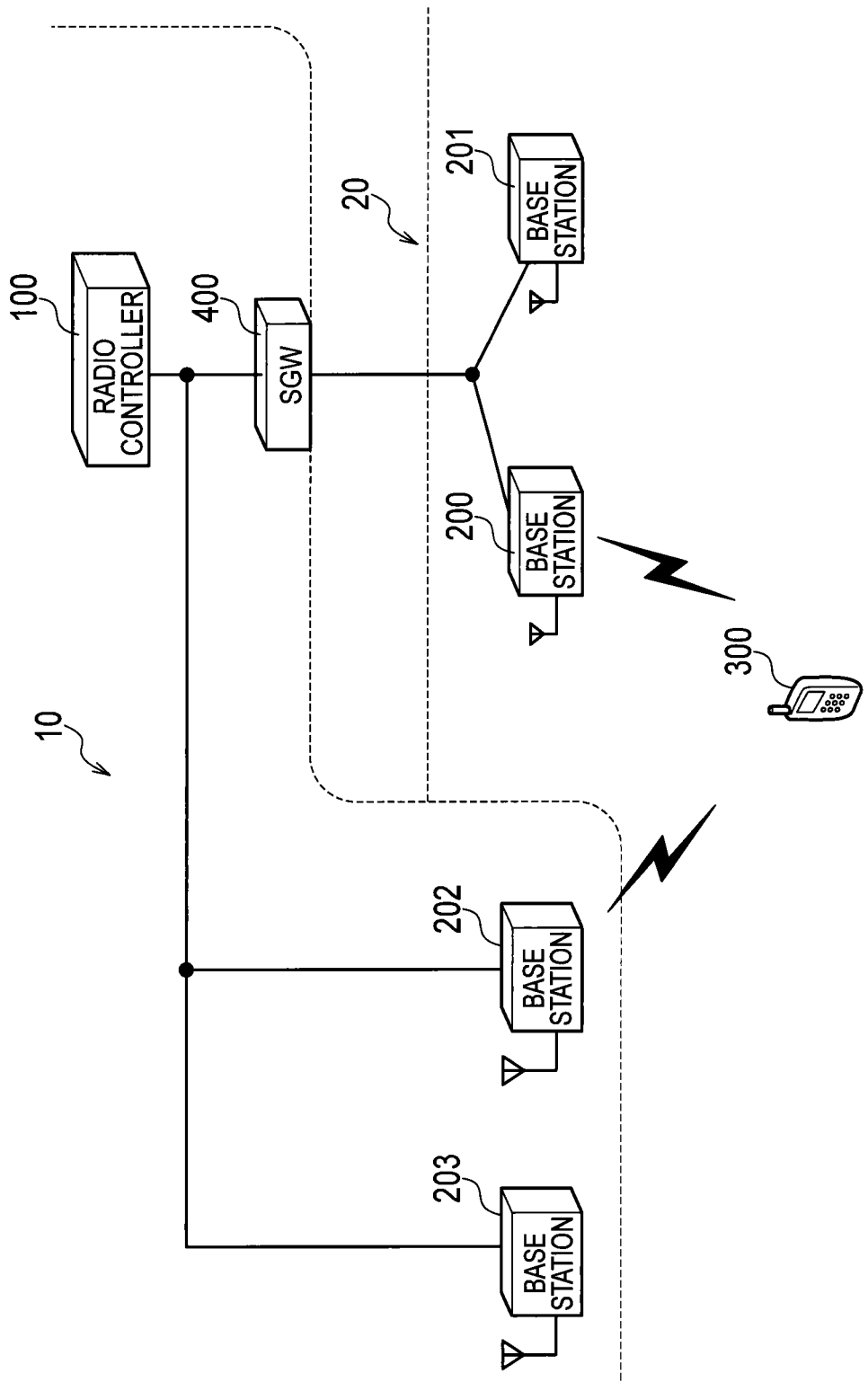
FIG. 1 is an overall configuration diagram of a mobile communication system according to an embodiment of the present invention.

Now, an embodiment of the present invention is described below by referring to the drawings. In the following description of the drawings, same or similar reference numerals are given to denote same or similar portions. Note that the drawings are merely schematically shown and proportions of sizes and the like are different from actual ones.

Thus, specific sizes and the like should be judged by referring to the description below. In addition, there are of course included portions where relationships or percentages of sizes of the drawings are different with respect to one another.

(1) Overall Configuration of Mobile Communication System

FIG. 1 is an overall configuration diagram of a mobile communication system according to this embodiment. Specifically, FIG. 1 shows a configuration example of a typical radio access network in a mobile communication system.

The mobile communication system shown in FIG. 1 supports a W-CDMA scheme. Base stations 200 to 203 are communicably connected to a radio controller 100. The radio controller 100 is configured to allocate to each of the base stations 200 to 203, a radio parameter required for the base station to perform radio communications with a mobile station 300, and perform managing thereof.

More particularly, the mobile communication system according to this embodiment controls the mobility of the mobile station 300 from a predetermined cell formed by a base station to a neighboring cell in the neighborhood of the predetermined cell based on a path loss value. The path loss value is based on a radio signal transmitted from the base station forming the predetermined cell, more specifically, a predetermined transmission power value as a transmission power value of a common control channel and a reception power value of the radio signal in the mobile station 300.

More specifically, a common pilot channel (CPICH) is used as the common control channel, and a path loss value is obtained from a difference between a transmission power value of the CPICH and a reception power value of the CPICH in the mobile station 300.

The base station 200 and the base station 201 are each a small base station (Home eNodeB) managed by a user of a communication service provided by a mobile network operator. The base station 200 and the base station 201 are both provided in a Local Access Network (LAN) managed by the user, and are connected to the radio controller 100 provided on a mobile network operator network 10 through an access line provider network 20 providing FTTH or ADSL.

A Security Gateway (SGW) 400 is provided at a border between the mobile network operator network 10 and the access line provider network 20. The SGW 400 is a gateway for protecting the mobile network operator network 10 from an unauthorized access from other communication networks. The SGW 400 permits the access only to the mobile network operator network 10 authorized through a predetermined authentication procedure.

In this embodiment, the base station 200 and the base station 201 (home base station) are assumed to be respectively owned by different users. Thus, the mobile station of the user managing one of the base stations is not authorized to access the other base station. Meanwhile, the base station 202 and the base station 203 are base stations for public communications and are installed on the mobile network operator network 10. The mobile station of the user of the mobile network operator can connect to the base station 202 and the base station 203 without any particular limitations.

(2) Mobility Control Using Path Loss Value

Next, a concept of mobility control for the mobile station 300 based on the path loss value is described with reference to FIG. 2 to FIG. 4.

(2.1) Control Example 1

Figure 2:
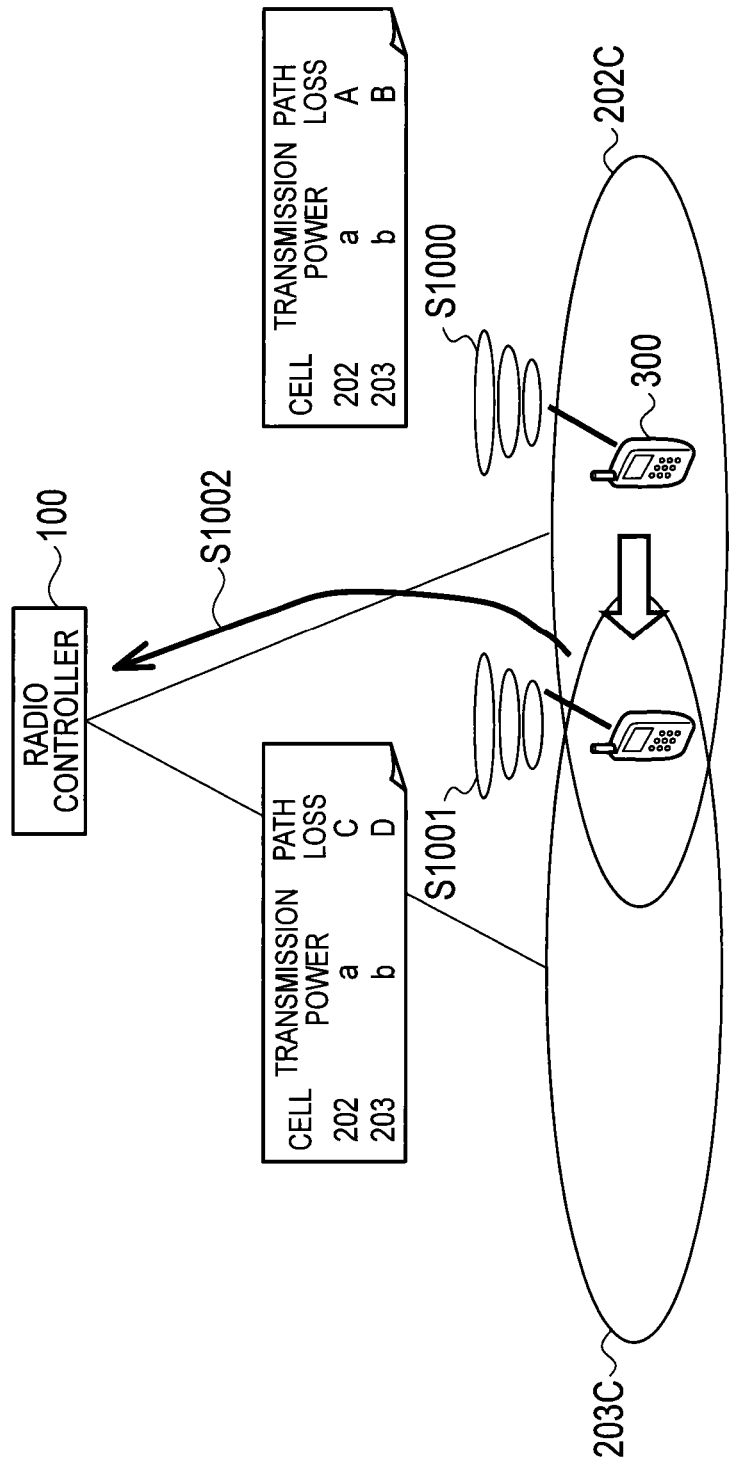
FIG. 2 is a diagram showing an example of handover control for a mobile station 300 between a cell 202 and a cell 203 with the same transmission power of a common control channel.

FIG. 2 shows an example of handover control for the mobile station 300 between a cell 202C and a cell 203C with the same transmission power value of the common control channel. It is assumed that the cell 202C is formed by the base station 202 and the cell 203C is formed by the base station 203.

As shown in FIG. 2, the mobile station 300 calculates a path loss #A based on a transmission power value a and a reception power value of the cell 202C communicating with the mobile station 300. Similarly, the mobile station 300 calculates a path loss #B of the cell 203C as a potential handover target based on a transmission power value b and a reception power value thereof (Step S1000). It is assumed that the transmission power value a has been notified through the common control channel transmitted by the base station 202.

Then, when the mobile station 300 moves toward the cell 203C (see the arrow in the figure), the path loss of the cell 202C calculated by the mobile station 300 increases up to a path loss #C, and the path loss of the cell 203C reduces down to a path loss #D (Step S1001).

When the value of the path loss #D is within a predetermined range with respect to the path loss #C, the mobile station 300 transmits to a network (radio controller 100), a signal requesting handover to the cell 203 (Step S1002).

(2.2) Control Example 2

Figure 3:
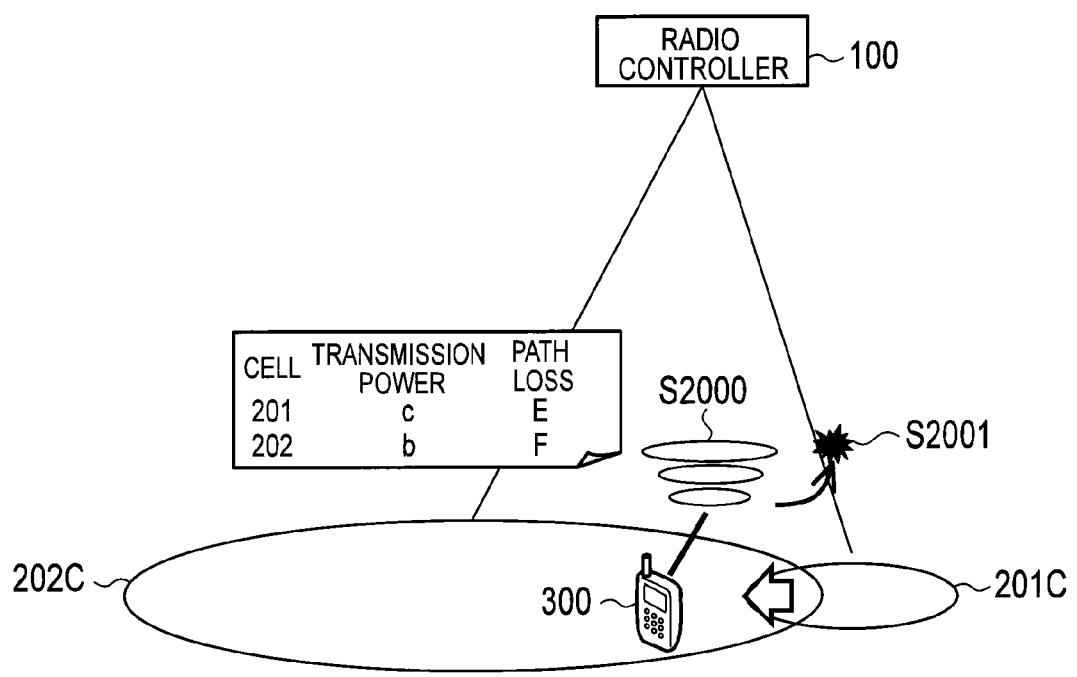
FIG. 3 is a diagram showing an example of handover control for a mobile station 300 between a cell 202 and a cell 203 with different transmission powers of a common control channel.

FIG. 3 shows a handover control example of the mobile station 300 between the cell 201C and the cell 202C with different transmission power values of the common control channel. It is assumed that the cell 201C is formed by the base station 201. Here, it is further assumed that the transmission power value of the cell 201C of the common control channel is smaller than that of the cell 202C.

As shown in FIG. 3, the mobile station 300 compares a path loss #E of the cell 201C and a path loss #F of the cell 202C as in FIG. 2 (Step S2000). Here, a transmission power value c of the cell 201C is smaller than a transmission power value b. Thus, the mobile station 300 requesting handover between the cells when the difference in path loss (E-F) between the cells is in a predetermined range is at a position outside the service area of the cell 201C. Accordingly, the smooth handover, i.e., mobility control for the mobile station 300 cannot be performed (Step S2001).

As in Control Example 3 described below, this embodiment can prevent the mobile station requesting the handover from being located outside the service area of the cell 201C in a case where the handover of the mobile station 300 is performed based on the path loss value.

(2.3) Control Example 3

FIGS. 4(*a*) and (*b*) show a handover example of the mobile station 300 prevented from requesting the handover at a position outside the service area of the cell 201C.

As shown in FIG. 4(*a*) and (*b*), in the cell 201C, a power offset α is notified by using the common control channel (Step S3000).

The mobile station 300 calculates a path loss #G of the cell 201C based on a transmission power value c, and calculates a path loss #H of the cell 202C by adding the received power offset α to the transmission power value b of the cell 202C (Step S3001). For example, the mobile station 300 adds −30 dBm as the power offset α when the transmission power value b is 40 dBm. Thus, the transmission power value b is corrected to 10 dBm. A method for determining the power offset α is described later.

When such a calculation using the power offset α is performed in the mobile station 300, the value of the path loss #H of the cell 202C becomes spuriously smaller than the value of the path loss #G of the cell 201C. This provides a situation equivalent to that where an area of the cell 202C in which the common communication channel is receivable at a predetermined reception power value or more is widened. Thus, the mobile station 300 can be handed over to the cell 202C while being sufficiently within the service area of the cell 201C (Step S3002).

(3) Functional Block Configuration of Mobile Communication System

Next, a functional block configuration of the mobile communication system described above will be described. Specifically, functional block configurations of the base station 201 and the radio controller 100 are described.

(3.1) Base Station 201

Figure 5:
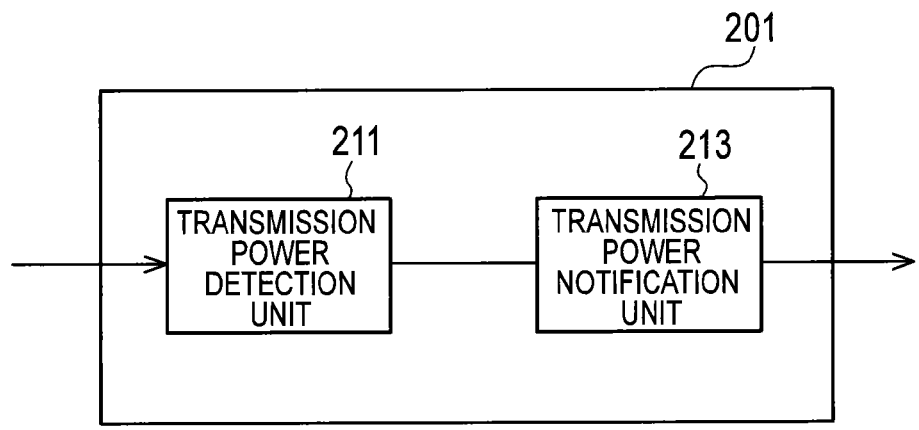
FIG. 5 is a functional block configuration diagram of a base station 201 according to the embodiment of the present invention.

FIG. 5 is a functional block configuration diagram of the base station 201. As shown in FIG. 5, the base station 201 includes a transmission power detection unit 211 and a transmission power notification unit 213. It is to be noted that the other base stations (base stations 200, 202, and 203) each have the same functional block configuration.

The transmission power detection unit 211 is configured to detect a neighboring cell transmission power value (e.g., transmission power value b) that is a transmission power value of a radio signal transmitted from a base station forming a neighboring cell (e.g., cell 202C) of the cell 201C formed by the base station 201.

Specifically, the transmission power detection unit 211 is configured to receive notification including the transmission power value of the common control channel transmitted by the neighboring cell, and detect the neighboring cell transmission power value based on the received notification. In this embodiment, the transmission power detection unit 211 acquires the transmission power value of the CPICH transmitted by the neighboring cell. The transmission power value of the CPICH is notified on the CPICH transmitted by the neighboring cell.

The transmission power notification unit 213 is configured to notify the radio controller 10 of the transmission power value of the neighboring cell detected by the transmission power detection unit 211.

(3.2) Radio Controller 100

Figure 6:
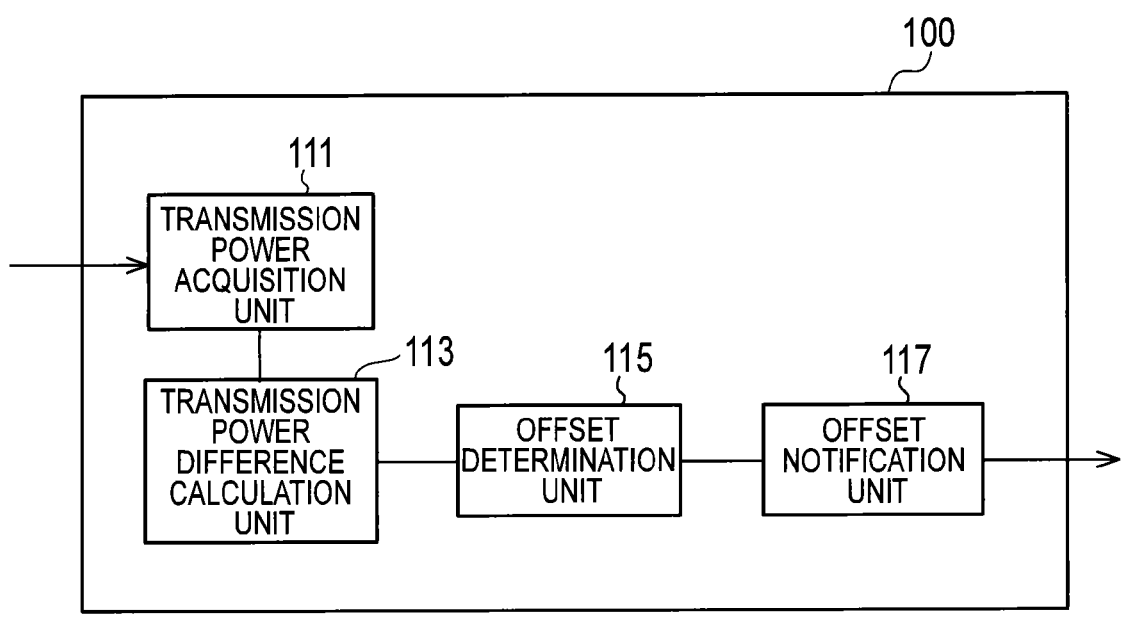
FIG. 6 is a functional block configuration diagram of a radio controller 100 according to the embodiment of the present invention.

FIG. 6 is a functional block configuration diagram of the radio controller 100. As shown in FIG. 6, the radio controller 100 includes a transmission power acquisition unit 111, a transmission power difference calculation unit 113, an offset determination unit 115, and an offset notification unit 117.

The transmission power acquisition unit 111 is configured to acquire from each base station, the notified transmission power value of the common control channel in the neighboring cell of the cell formed by the base station.

The transmission power difference calculation unit 113 is configured to calculate the difference in the transmission power of the common control channel between the own base station and each of the other base stations (cells) based on the transmission power value (neighboring cell transmission power value) acquired by the transmission power acquisition unit 111. For example, upon being notified of the transmission power values of the common control channel in the cells (neighboring cells) formed by the base stations 200, 202, and 203 from the base station 201, the transmission power difference calculation unit 113 calculates the difference between the transmission power value of the common control channel in each cell and the transmission power value of the common control channel in the own cell (cell 201C formed by the base station 201).

The offset determination unit 115 is configured to determine the power offset α used by the mobile station 300 for calculating the path loss value. For example, the offset determination unit 115 is configured to determine the power offset α of the neighboring cell to be added to the predetermined transmission power value based on the difference between the transmission power value (predetermined transmission power value) of the common control channel of the base station 201 forming the cell 201C (predetermined cell) and the transmission power value (neighboring cell transmission power value) of the common control channel in the neighboring cell of the cell 201C.

Specifically, the offset determination unit 115 is configured to determine the difference between the predetermined transmission power value and the neighboring cell transmission power value as the power offset α. FIG. 8 shows an example of a transmission power offset table 500 determined by the offset determination unit 115.

As shown in FIG. 8, the offset determination unit 115 is configured to calculate the power offset α for each base station (cell). For example, the offset determination unit 115 determines 5 dbm as the power offset α of the base station 201 (cell 201C). 5 dBm is obtained as the difference between 10 dBm as the transmission power value (predetermined transmission power value) of the base station 200 and 5 dBm as the transmission power value (neighboring cell transmission power value) of the base station 201.

The offset notification unit 117 is configured to notify the power offset α determined by the offset determination unit 115 to the mobile station 300. Specifically, the offset notification unit 117 is configured to notify the power offset α calculated for each base station to the base station.

(4) Operation of Mobile Communication System

Figure 7:
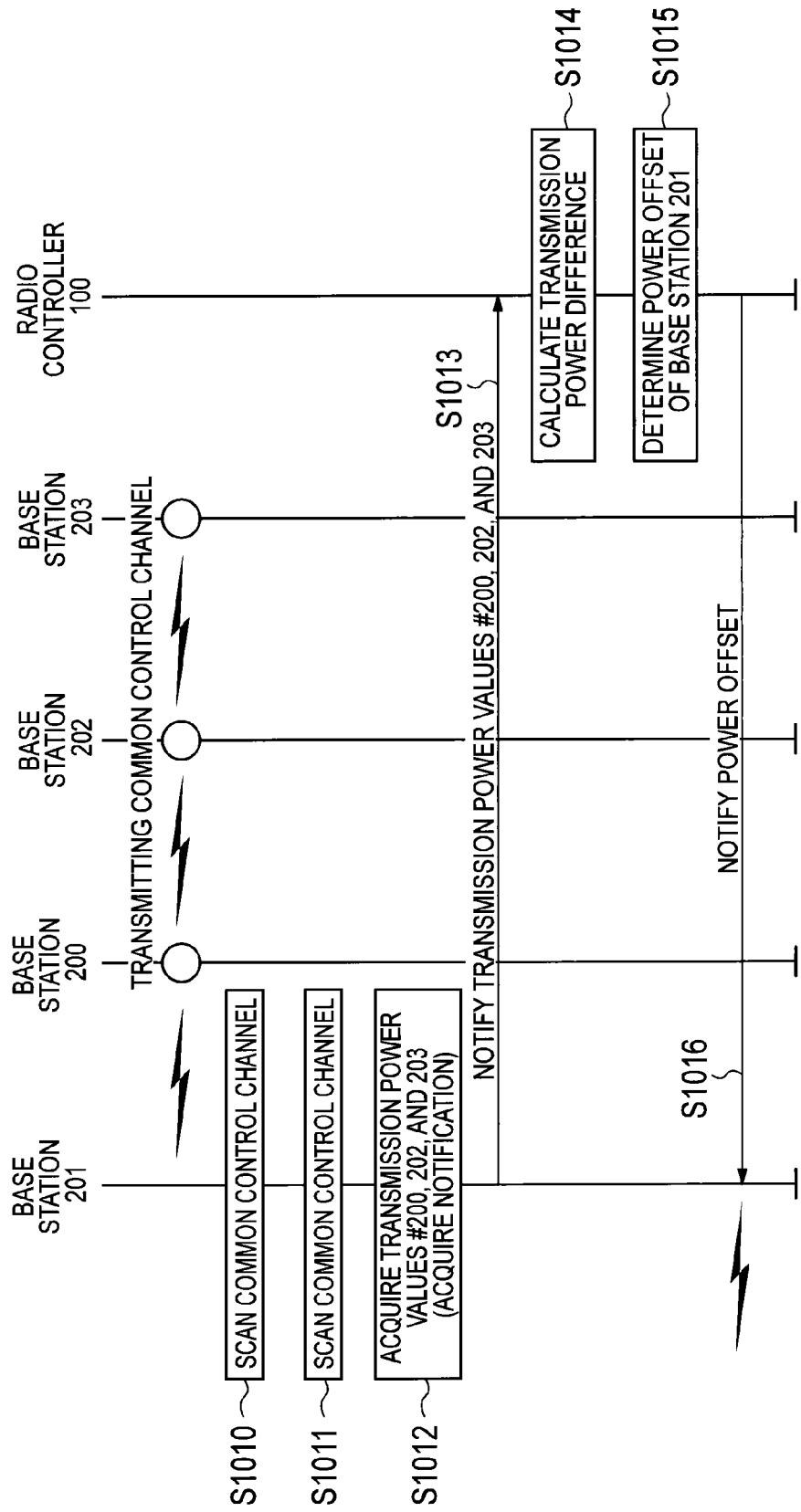
FIG. 7 is a diagram showing a determination sequence for a power offset a in the mobile communication system according to the embodiment of the present invention.

Next, an operation the mobile communication system will be described. Specifically, the description is given on the operation performed by the mobile communication system for determining the power offset α. FIG. 7 shows a sequence for determining the power offset α in the mobile communication system according to this embodiment. FIG. 7 exemplifies a sequence for automatically adjusting the power offset a employed in the base stations 200, 202, and 203 each forming the neighboring cell of the cell 201C formed by the base station 201. The same operation can be executed in base stations other than the base station 201

As shown in FIG. 7, the base station 201 periodically scans the common control channel (CPICH) transmitted by the base station forming the neighboring cell of the cell 201C, and receives the notification transmitted through the common control channel (Steps S1010 and S1011).

The base station 201 acquires the transmission power value of the common control channel in the neighboring cell included in the received notification (Step S1012). Specifically, the base station 201 acquires the transmission power value of the common control channel transmitted from each of the base stations 200, 202, and 203.

The base station 201 notifies the radio controller 100 of the acquired transmission power value of each of the base stations 200, 202 and 203 (Step S1013).

The radio controller 100 calculates the difference between the transmission power value of the own base station (base station 201) and each of the transmission power values of the neighboring cells (base stations 200, 202, and 203) notified from the base station 201 (Step S1014). For example, when the transmission power value of the base station 201 is 5 dBm, and the transmission power value of the base station 200 is 10 dBm (see FIG. 8), the radio controller 100 calculates −5 dBm as the difference. The radio controller 100 similarly performs such a calculation for the base stations 202 and 203.

The radio controller 100 determines the calculated difference for each base station as the power offset α for the base station (Step S1015). As described above, the power offset α is added, i.e., subjected to the addition, to the power transmission value of the common control channel transmitted by the base station when the path loss value is calculated in the mobile station 300.

The radio controller 100 notifies the base station 201 of the determined power offset α for each base station (Step S1016). Upon receiving the power offset α, the base station 201 notifies the power offset α for each base station to the mobile station 300 by using the common control channel.

(5) Operation and Effect

In the mobile communication system according to this embodiment, the power offset α of the neighboring cell added to the predetermined transmission power value is determined based on the difference between the transmission power value (predetermined transmission power value) of the common control channel transmitted by the subject cell and the transmission power value (neighboring cell transmission power value) of the common communication channel transmitted by the neighboring cell. Thus, the mobile station 300 calculates the path loss value based on the transmission power value to which the power offset α is added.

Thus, the path loss value of the predetermined cell can be spuriously reduced when the path loss value is calculated by using the power offset α in the mobile station 300. This provides a situation equivalent to that where an area of the cell in which the common communication channel is receivable at a predetermined reception power value or more is widened. Thus, the mobile station 300 can be handed over to a handover target cell while being sufficiently within the service area of the cell, even when the transmission power of the cell is small. Accordingly, the smooth mobility of the mobile terminal 300 between cells can be achieved with a mobility control based on the path loss value of the mobile terminal, even when small cells such as femtocells are freely installed.

In this embodiment, the notification transmitted through the common control channel includes the transmission power value of the transmission source cell, and the neighboring cell transmission power is detected based on the notification received by each base station. Thus, each base station can efficiently acquire the transmission power value of the neighboring cell.

In this embodiment, the difference between the predetermined transmission power value and the neighboring cell transmission power value is determined as the power offset α. Thus, a sufficient effect (smooth mobility control for the mobile station 300) may be obtained with a simple calculation.

(6) Other Embodiments

The present invention has been described by using the above-described embodiment. However, it should not be understood that the description and the drawings, which constitute one part of this disclosure, are to limit the present invention. Various alternative embodiments, examples, and operational techniques will be obvious for those who are in the art from this disclosure.

For example, in the embodiment of the present invention described above, the notification transmitted through the common control channel includes the transmission power value of the transmission source cell. Alternatively, each station may inquire the base station forming the neighboring cell of the transmission power of the base station.

Figure 9:
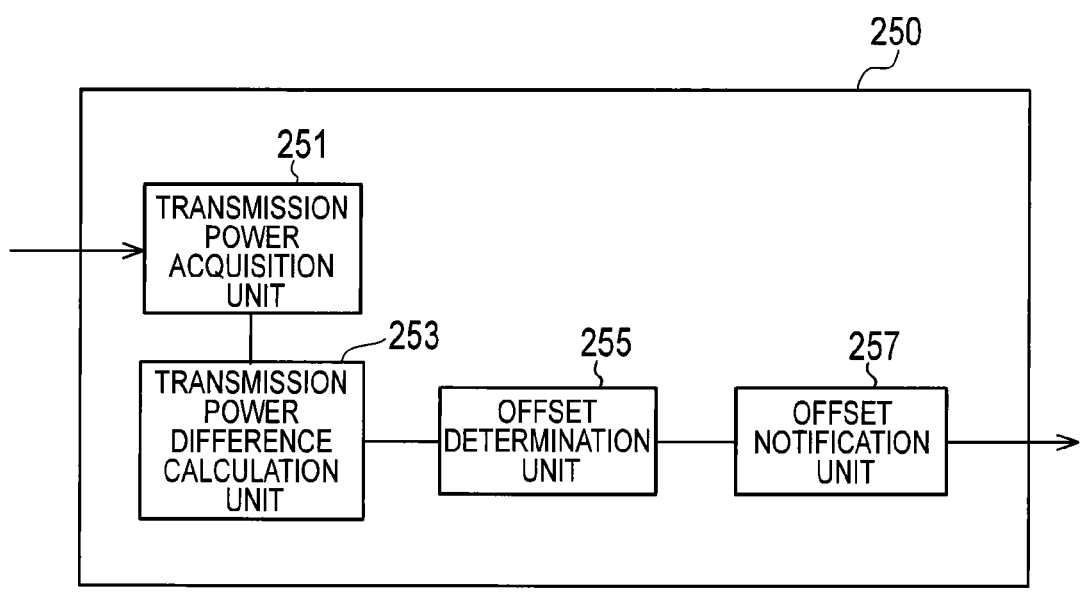
FIG. 9 is a functional block configuration diagram of a base station 250 according to a modification of the present invention.

The description has been given with the mobile communication system supporting the W-CDMA scheme as an example. In a case of an LTE (Long Term Evolution) system as the next generation system of W-CDMA, the base station may have the function of the radio controller 100. FIG. 9 is a functional block diagram of a base station 250 according to this modification. A transmission power acquisition unit 251, a transmission power difference calculation unit 253, an offset determination unit 255, and an offset notification unit 257 respectively provide the same functions as the transmission power acquisition unit 111, the transmission power difference calculation unit 113, the offset determination unit 115, and the offset notification unit 117 of the radio controller 100.

In the description of the embodiment described above, the cell neighboring the subject cell is the neighboring cell. The neighboring cell is not necessarily limited to the cell in the neighborhood, but may include a cell overlapping with the area of the subject cell and the like.

In the embodiment of the present invention described above, the difference between the predetermined transmission power and the neighboring cell transmission power is determined as the power offset α. Instead of determining the difference as the power offset α, an official power offset α may be determined by adding the difference to the predetermined power offset.

As described above, the present invention naturally includes various embodiments which are not described herein. Accordingly, the technical scope of the present invention should be determined only by the matters to define the invention in the scope of claims regarded as appropriate based on the description.

Note that the contents of Japanese Patent Application No. 2010-129427 (filed on Jun. 4, 2010) are hereby incorporated by reference in their entirety.

INDUSTRIAL APPLICABILITY

A feature of the present invention can provide a mobile communication system, a radio controller, a base station, and a mobile communication method that can achieve smooth mobility of a mobile station between cells with mobility control for the mobile terminal based on a path loss value, even when small cells such as femtocells are freely installed.

EXPLANATION OF THE REFERENCE NUMERALS

10 . . . mobile network operator network
20 . . . access line provider network
100 . . . radio controller
111 . . . transmission power acquisition unit
113 . . . transmission power difference acquisition unit
115 . . . offset determination unit
117 . . . offset notification unit
200 to 203 . . . base station
201C to 203C . . . cell
211 . . . transmission power detection unit
213 . . . transmission power notification unit
250 . . . base station
251 . . . transmission power acquisition unit
253 . . . transmission power difference acquisition unit
255 . . . offset determination unit
257 . . . offset notification unit
300 . . . mobile station
400 . . . SGW
500 . . . transmission power offset table

The invention claimed is:

1. A mobile communication system configured to control mobility of a mobile station from a predetermined cell to a neighboring cell of the predetermined cell on the basis of a path loss value based on a predetermined transmission power value that is a transmission power value of a radio signal transmitted from a base station forming the predetermined cell and a reception power value of the radio signal in the mobile station, the system comprising:
  circuitry configured to
    detect a neighboring cell transmission power value that is a transmission power value of a radio signal transmitted from a base station forming the neighboring cell; and
    determine a power offset of the neighboring cell to be added to the predetermined transmission power value, based on a difference between the predetermined transmission power value and the neighboring cell transmission power value; and
  a communication interface configured to notify the power offset to the mobile station, which calculates the path loss value by adding the power offset to the predetermined transmission power value.

2. The mobile communication system according to claim 1, wherein
  the communication interface is configured to receive a notification including a transmission power value of a common control channel transmitted by the neighboring cell; and
  the circuitry is configured to detect the neighboring cell transmission power value based on the received notification.

3. The mobile communication system according to claim 1, wherein the circuitry is configured to determine a difference between the predetermined transmission power value and the neighboring cell transmission value as the power offset.

4. A radio controller configured to control mobility of a mobile station from a predetermined cell to a neighboring cell of the predetermined cell on the basis of a path loss value based on a predetermined transmission power value that is a transmission power value of a radio signal transmitted from a base station forming the predetermined cell and a reception power value of the radio signal in the mobile station, the radio controller comprising:
  circuitry configured to
    acquire a neighboring cell transmission power value that is a transmission power value of a radio signal transmitted from a base station forming the neighboring cell; and
    determine a power offset of the neighboring cell to be added to the predetermined transmission power value, based on a difference between the predetermined transmission power value, based on a difference between the predetermined transmission power value and the neighboring cell transmission power value; and
  a communication interface configured to notify the power offset to the mobile station, which calculates the path loss value by adding the power offset to the predetermined transmission power value.

5. The radio controller according to claim 4, wherein the circuitry is configured to determine a difference between the predetermined transmission power value and the neighboring cell transmission value as the power offset.

6. A base station configured to control mobility of a mobile station from a predetermined cell to a neighboring cell of the predetermined cell on the basis of a path loss value based on a predetermined transmission power value that is a transmission power value of a radio signal transmitted from a base station forming the predetermined cell and a reception power value of the radio signal in the mobile station, the base station comprising:
  circuitry configured to
    detect a neighboring cell transmission power value that is a transmission power value of a radio signal transmitted from a base station forming the neighboring cell; and
    determine a power offset of the neighboring cell to be added to the predetermined transmission power value, based on a difference between the predetermined transmission power value and the neighboring cell transmission power value; and
  a communication interface configured to notify the power offset determined by the offset determination unit to the mobile station, which calculates the path loss value by adding the power offset to the predetermined transmission power value.

7. The base station according to claim 6, wherein the circuitry is configured to determine a difference between the predetermined transmission power value and the neighboring cell transmission value as the power offset.

8. A mobility control method for controlling mobility of a mobile station from a predetermined cell to a neighboring cell of the predetermined cell on the basis of a path loss value based on a predetermined transmission power value that is a transmission power value of a radio signal transmitted from a base station forming the predetermined cell and a reception power value of the radio signal in the mobile station, the method comprising the steps of:

- detecting a neighboring cell transmission power value that is a transmission power value of a radio signal transmitted from a base station forming the neighboring cell;
- determining a power offset of the neighboring cell to be added to the predetermined transmission power value, based on a difference between the predetermined transmission power value and the detected neighboring cell transmission power value; and
- notifying the determined power offset to the mobile station, which calculates the path loss value by adding the power offset to the predetermined transmission power value.

9. The mobility control method according to claim 8, wherein in the power offset determining step, a difference between the predetermined transmission power value and the neighboring cell transmission value is determined as the power offset.

* * * * *